Feb. 20, 1934.   F. M. YOUNG   1,947,689
HIGH TEMPERATURE BONDING APPARATUS
Filed June 13, 1932   3 Sheets-Sheet 1
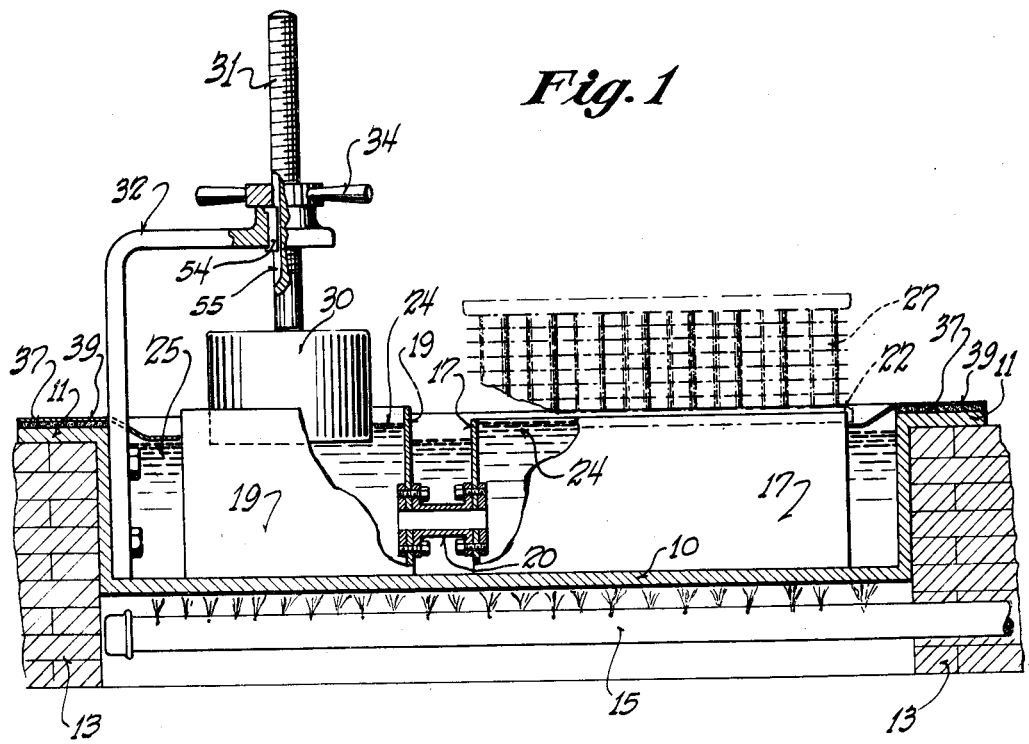
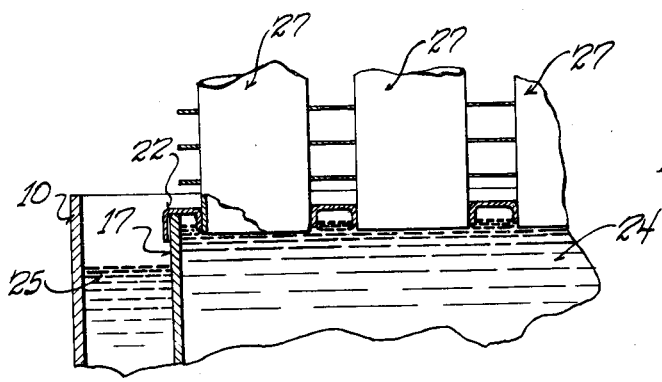
INVENTOR
Fred M Young
BY Ira Milton Jones
ATTORNEY Feb. 20, 1934.  F. M. YOUNG  1,947,689
HIGH TEMPERATURE BONDING APPARATUS
Filed June 13, 1932  3 Sheets-Sheet 2
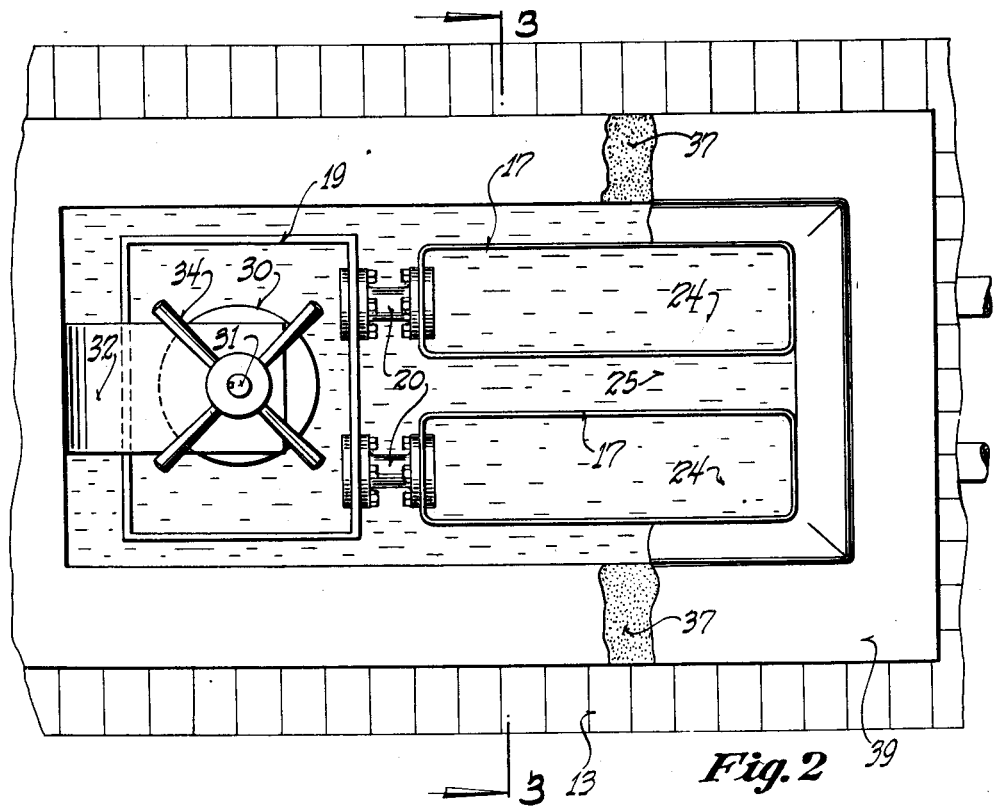
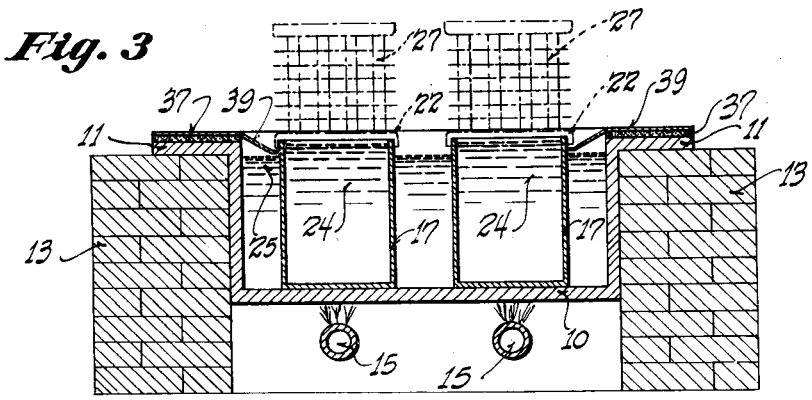
INVENTOR
Fred M Young
BY
ATTORNEY Feb. 20, 1934.  F. M. YOUNG  1,947,689

HIGH TEMPERATURE BONDING APPARATUS

Filed June 13, 1932  3 Sheets-Sheet 3

INVENTOR
Fred M Young
BY Ira Milton Jones
ATTORNEY

Patented Feb. 20, 1934

1,947,689

UNITED STATES PATENT OFFICE 1,947,689

HIGH TEMPERATURE BONDING APPARATUS

Fred M. Young, Racine, Wis.

Application June 13, 1932. Serial No. 616,846

8 Claims. (Cl. 113—59)

This invention relates to high temperature bonding apparatus and has reference to an apparatus to facilitate the bonding of a radiator or convector core onto its header plates.

In radiator construction wherein the core of the radiator projects through holes in the header plates, the usual practice is to fasten the two together by dipping both in a bath of solder or some other suitable high temperature bonding substance. This of necessity gets a certain amount of solder on the outer edges of the header plates which must be removed before the radiator is completed.

It is a particular object of the present invention to devise a method whereby the joint between the header plates and the core of the radiator may be high temperature bonded by immersing it in a bath of the desired bonding substance without subjecting the outer edges of the header plate to the bath.

Another object of the present invention is to devise an apparatus whereby the above result may be accomplished.

Another object of the invention is to increase production and reduce the cost and simplify the construction of the radiator unit in general.

A further object of this invention is to provide a high temperature bonding bath with displacement means for maintaining the bath of liquid bonding material at a predetermined level.

And a still further object of this invention resides in the provision of automatic means for maintaining the level of the fluid bonding substance constant.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a vertical elevational view partly in cross section of a preferred form of the invention;

Figure 2 is a plan view of the device shown in Fig. 1, parts thereof being shown in cross section;

Figure 3 is a cross section on the line 3—3 of Fig. 2 showing a radiator core in position to be soldered;

Figure 4 is an enlarged detail of Fig. 3 showing the radiator core and header plate and illustrating the method of soldering the joint therebetween;

Figure 5:
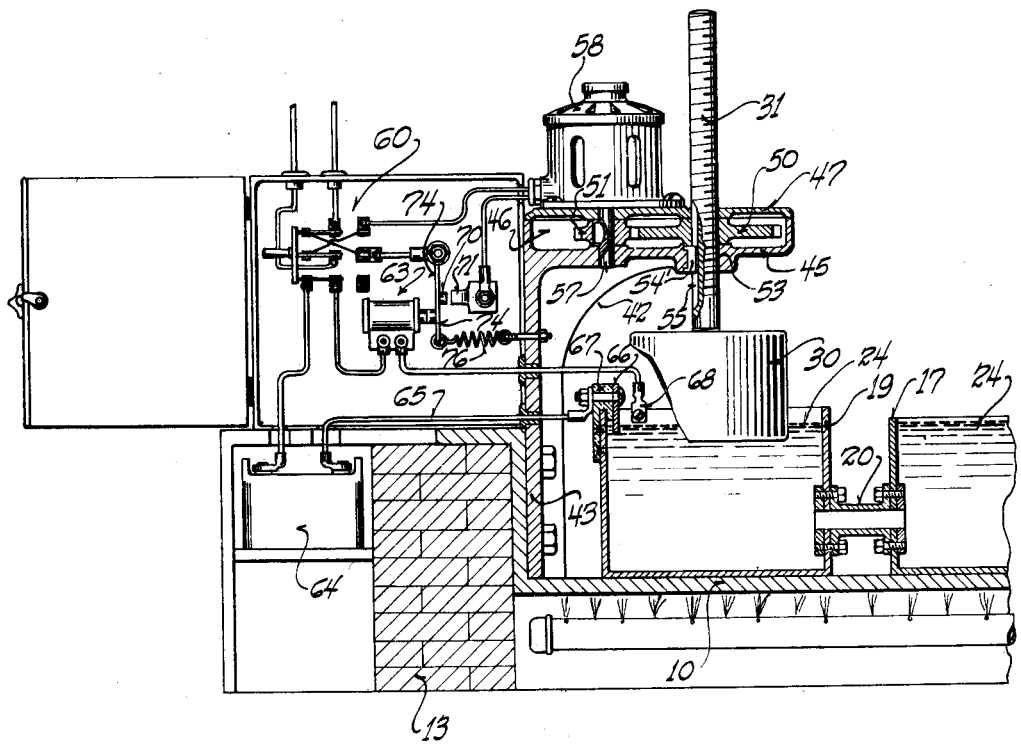
Figure 5 is a modification of the invention involving automatic control of the solder level.

Referring to the drawings in which like numerals indicate like parts throughout the several views, a container or pan 10 has out-turned upper edges 11 resting on a base 13 of refractory brick or other suitable material. A gas flame or equivalent source of heat 15 is mounted beneath the pan 10 and within the base 13.

The pan 10 holds a pair of special containers 17 and a reserve pot or reservoir 19, the containers 17 and the reservoir 19 being interconnected through pipes 20 to permit the free flow of molten solder or other high temperature bonding substance 24 between the containers 17 and the reserve pot 19. The containers 17 are made with the outside periphery thereof conforming in shape to, but slightly smaller than, the inner periphery of the header plate 22 of the convector to be assembled so that the flange at the edges of the header plate fit down over the outside of the containers 17 with the joints between the header plate and the tubes 27 of the convector core projecting downwardly into the interior of the container as clearly shown in Fig. 4.

The molten solder or high temperature bonding substance 24, which fills the containers 17 and the pot 19, is heated from the source 15 through a heat transfer material 25, such as solder, lead, or other suitable easily fused material, which fills the pan 10 and surrounds the containers 17 and the reserve pot 19.

As shown in Fig. 4, the convector header plates have inturned shoulders or flanges surrounding the ports through which the tubes of the core pass, so that when a convector is in position to be bonded, the joints between the header plate and tubes 27 project downward into the container 17 and into the molten solder or other high temperature bonding material. The normal level of the bonding material, of necessity must be above the lower edge of the joints so that when an unsoldered convector unit is put in place above a container 17, the molten bonding material will reach the lower edge of the joints and flow up into the joints to a point above the level of the molten bonding material in the container, by capillary action to securely seal the joint.

It will be obvious that some means must be provided to maintain the level of the molten bonding material as it is used. This may be accomplished by hand as shown in Figs. 1 and 2, or it may be automatically maintained by means of the electrical control shown in Figs. 4 and 5.

In the embodiment of the invention shown in Figs. 1 and 2, the level of the fluid bonding material in the containers 17 is maintained as desired by means of a weighted displacement member 30 which projects downwardly into the fluid material in the reserve pot 19. The extent of the immersion of the displacement member 30 in the pot contents determines the level of the molten bonding material in the interconnected pot 19 and containers 17.

A threaded stem 31 supported by the engagement of a nut 34 with a bracket 32 suspends the displacement member at a desired height. The stem 31 is slidably received in a bearing formed in the overhanging end portion of the bracket and is held against rotation by a key 54 slidably received in a keyway 55 formed in the stem 31.

A shield 37 made of asbestos or other suitable material and generally rectangular in shape fits about the periphery of the pan on the outturned portion 11 and has a shield 39 supported thereon and projecting over the material 25 in the pan 10 to lie closely adjacent the containers 17 and the reserve pot 19. The shield 39 prevents accidents through dropping articles in the heat transfer material, or burning of the operator through carelessness.

Figure 6:
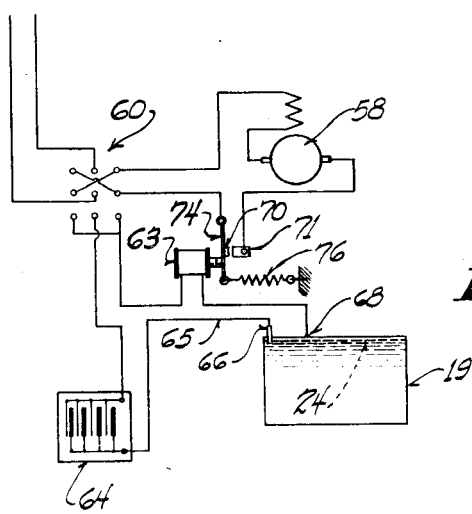
Figure 6 is a wiring diagram showing the electrical control disclosed in Fig. 5.

In the form shown in Figs. 5 and 6, the pan 10 mounts a right angle bracket, generally designated 42, with its vertical arm 43 attached to the pan and its horizontal arm 45 recessed as shown at 46 and provided with a cover 47 to form a housing for a gear 50 and a pinion 51 which operates the stem or shaft 31.

The arm 45 is provided with a port 53 having a key 54' therein to slidably engage the keyway 55 in the threaded stem 31.

The gear 50 is provided with a threaded bore to engage the threaded stem 31, so that upon turning the gear 50 the stem 31 moves up or down depending upon the direction of rotation. The pinion 51 is keyed or otherwise fixed to a shaft 57 of a motor 58. The motor 58 is preferably of the type which may be reversed by reversing the current, and is controlled by a triple pole double throw switch 60 through a relay, generally designated 63.

Two of the poles of the switch 60 are utilized to control the supply of current to the motor and reverse the circuit upon throwing over of the switch while the third pole controls the current to the relay 63. The relay 63 is operated from a storage battery 64 through the line 65 which runs to a contact 66. The contact 66 is mounted on an insulating member 67 and projects down into the reservoir 19 so that the lower end of the terminal 66 is at the desired level of the bonding material. The position of the contact 66 may be made adjustable within the reservoir 19 if desired.

A terminal 68 is connected directly to the pot 19 so that when the molten high temperature bonding material rises to the level of the contact 66, current will follow through the bonding material to the terminal 68 to energize the relay 63.

The energization of the relay 63 effects a breaking of a pair of contacts 70 and 71 which cuts off current from the motor 58. The contact 70 is mounted on an armature 74 and may be urged to engagement with the contact 71 by a spring 76.

In operation, the reservoir or pot 19 and the containers 17 are filled with solder or other high temperature bonding material to the desired level and the pan 10 surrounding the containers in the reservoir is likewise filled with a suitable heat transfer material to a proper level which is below the outer edge of the header plate 22, as clearly shown in Fig. 4. The bonding material is heated by the heating unit 15, the heat being transmitted from the flame through the walls of the pan 10 and through the material 25 in the pan 10 to the bonding material 24 in the containers 17 and in the reservoir or pot 19.

An assembled convector may then be set on top of one of the containers 17, as shown in Fig. 4, with the lower ends of the joints between its header plate and the core tubes dipping into the bonding material 24. The bonding material flows up into the joints between the header plate 22 and the core tubes 27 by capillary action to firmly seal the joint. Inasmuch as the level of the heat transfer material 25 in the pan 10 is below the flanged edge of the header plate 22, it will be noted that no solder can possibly get on the outside of the header plate.

Since it is necessary for the assembled core and header plate to remain a short time with the joints immersed in the fluid bonding material so as to allow capillary action to take effect, two containers 17 have been provided to facilitate the work. With two containers 17, a convector unit may be placed on one container and allowed to stand there while another unit is being applied to the other container, thus practically doubling the amount of work turned out by a single operator.

As the level of the bonding material in the container 17 is governed by the position of the weighted displacement member 30, the operator can, therefore, raise the level of the bonding material in the reservoir 19 and the containers 17 to any desired level by simply lowering the member 30 into the bonding material. This may be accomplished, in Figs. 1 and 2, by screwing the nut 34 up on the shaft 31, which permits the weight to sink into the material in the pot 19.

The form shown in Fig. 5 provides for this regulation automatically in that when the level of the bonding material falls below the contact 66 the current to the relay 63 is interrupted and the spring 76 acts to draw the contacts 70 and 71 together to make the circuit to the motor. The motor operating through gear 50 and pinion 51 lowers the weighted member 30 into the contents of the pot 19 until the level thereof is raised to the level of the contact 66. At this point the circuit is completed between the contacts 66 and 68 to energize the relay and break the connection between the contacts 70 and 71 to stop the motor.

When it is necessary to add more bonding material to the reservoir or pot, the switch 60 is reversed to a position opposite that shown in Fig. 5. This operates the motor independently of the relay 63, but in an opposite direction to lift the weighted members 30 and afford space for the additional bonding material.

From the foregoing description taken in connection with the accompanying drawings, it will be readily apparent to one skilled in the art that this invention affords novel means for bonding the header plates of convector units to the core thereof; that the desired bond is obtained without subjecting those portions of the header plate upon which a coating of bonding material is undesirable to the bonding material; and that by reason of the fact that only the actual joints to be bonded are subjected to the bonding material, waste is eliminated.

It is also apparent that although this invention is particularly adapted to the bonding of header plates to the tubes of the cores of convector units and radiators, the salient features thereof are susceptible to many different uses where a predetermined level of fluid bonding material is desirable; and it is to be understood that the terms "convector" and "radiator" as used in the specification and claims, cover any type of heat transfer unit.

What I claim as my invention is:

1. A device for bonding the header plates of a convector unit onto the core thereof comprising, a container shaped to fit the inside of said header plates and over which a header plate is adapted to be fitted with the joints between the header plate and the core projecting downwardly into the container, a reservoir in open communication with said container, a high temperature bonding material in said container and reservoir, a member projectable into the reservoir to displace the bonding material, and means including an automatically controlled electric motor to project the member into the reservoir and maintain the bonding material in said container at a desired level.

2. A device to solder the joints between header plates and the core of a radiator comprising, a pan, a container mounted in said pan, said container being shaped to fit the interior of the header plate and adapted to receive a header plate thereon with the joints between the plate and the core projecting downwardly into the container, heat transfer material within said pan and surrounding said container, and below the level of the lower edge of said header plate when in position over the container, and solder within said container above the lower level of said joints.

3. A device to solder the joints between header plates and the core of a radiator comprising, a pan, a container mounted in said pan, said container being shaped to fit into the interior of a header plate and adapted to receive a header plate thereon with the joints between the plate and the core projecting downwardly into said container, heat transfer material within said pan and surrounding said container and lying below the level of the lower edge of said header plate when in position over the container, solder within said container above the lower level of said joints, and means to maintain the solder in said container at a desired level.

4. A device to solder the joints between the header plates and the core of a radiator, a pan, a container mounted in said pan, said container being shaped to fit into the interior of a header plate and adapted to receive a header plate thereon with the joints between the plate and the core projecting downwardly into said container, heat transfer material within said pan surrounding said container and below the level of the lower edge of said header plate when said header plate is in position over the container, solder within said container above the level of said joints, and means including an automatically actuated electric motor to maintain the level of the solder within the container at a desired level.

5. A device to solder the joints between the header plates and the core of a radiator comprising, a pan, a container mounted in said pan, said container being shaped to fit into the interior of the header plates and adapted to receive a header plate thereon with the joints between the header plate and the core projecting downwardly into said container, a reservoir mounted within said pan and in open communication with said container adjacent the lower portion thereof, a heat transfer medium within said pan and surrounding said container and said reservoir and lying entirely below the level of the lower edge of said header plate when said header plate is in position over the container, solder within said container and reservoir above the lower level of said joints, and means to maintain said solder in said container at a desired level.

6. In a device to solder joints between the header plates and the core of a radiator comprising, a pan, a container mounted within said pan, said container being shaped to fit into the interior of the header plates and adapted to receive a header plate thereon with the joints between the plate and the core projecting downwardly into said container, a reservoir in said pan in open communication with said container at a point below the top thereof, heat transfer material within said pan surrounding said container and lying below the lower level of the lower edge of said header plate when said header plate is in position over the container, solder within said container and said reservoir above the lower level of said joints, and means projecting into said solder to maintain the same at a desired level.

7. In a device to solder joints between the header plates and the core of a radiator comprising, a pan, a container mounted within said pan, said container being shaped to fit into the interior of the header plates and adapted to receive a header plate thereover with the joints between the plate and the core projecting downwardly into the container, a reservoir in said pan in open communication with said container at a point below the top thereof, heat transfer material within said pan and surrounding said container and lying below the lower level of the lower edge of said header plate when said header plate is in position over the container, solder within said container and said reservoir above the lower level of said joints, means projecting into said solder, and means including an electric motor operable automatically upon lowering of the level of solder in said container to project said means farther into the solder and restore said level.

8. In a device to solder joints between the header plates and the core of a radiator comprising, a pan, a container mounted within said pan, said container being shaped to fit into the interior of the header plates and adapted to receive a header plate thereover with the joints between the plate and the core projecting downwardly into said container, a reservoir in said pan in open communication with said container at a point below the top thereof, heat transfer material within the pan and surrounding said container and lying below the level of the lower edge of said header plate when said header plate is in position over the container, solder within said container and said reservoir above the lower level of said joints, a bracket attached to said pan and having an arm thereof projecting over said reservoir, a weight supported from said arm and depending into said solder, means to raise and lower the weight with respect to said solder, an electric motor connected to said means, and means operable upon the lowering of the level of the solder beyond a given point to complete a circuit to said motor to lower said weight and raise the level of solder in said container.

FRED M. YOUNG.